United States Patent [19]

Dunn et al.

[11] 4,349,376
[45] Sep. 14, 1982

[54] LIQUID COOLED SKIMMER

[75] Inventors: Charles S. Dunn, Pataskala; Charles M. Hohman, Granville, both of Ohio

[73] Assignee: Owens-Corning Fiberglas Corporation, Toledo, Ohio

[21] Appl. No.: 271,459

[22] Filed: Jun. 8, 1981

[51] Int. Cl.³ .............................................. C03B 5/20
[52] U.S. Cl. ........................................ 65/345; 65/337; 65/340; 65/346; 65/356
[58] Field of Search ................. 65/339, 340, 345, 337, 65/346, 347, 356

[56] References Cited

U.S. PATENT DOCUMENTS

| | | | |
|---|---|---|---|
| 3,321,288 | 5/1967 | Griem, Jr. | 65/346 X |
| 3,976,464 | 8/1976 | Wardlaw | 65/345 X |
| 4,052,186 | 10/1977 | Rhodes | 65/337 X |
| 4,317,669 | 3/1982 | Boss et al. | 65/340 X |

FOREIGN PATENT DOCUMENTS 367939  4/1963  Switzerland ..................... 65/356

Primary Examiner—Arthur D. Kellogg
Attorney, Agent, or Firm—Ronald C. Hudgens; Patrick P. Pacella; Paul T. Kashimba

[57] ABSTRACT

A skimmer for use in a throat of a melting furnace. The skimmer comprises a plate having a plurality of passages therein with the passages being through the plate from a first side to a second side. Adjacent passages are in communication with each other to form a continuous passage through the plate. A first means for blocking the ends of the passages on the first side of the plate and a second means for blocking the ends of the passages on the second side of the plate are attached to the plate. A first port means is in communication with one end of the continuous passage for connecting with a cooling inlet located outside of the furnace, and a second port means is in communication with the other end of the continuous passage for connecting with a cooling outlet located outside of the furnace.

10 Claims, 9 Drawing Figures

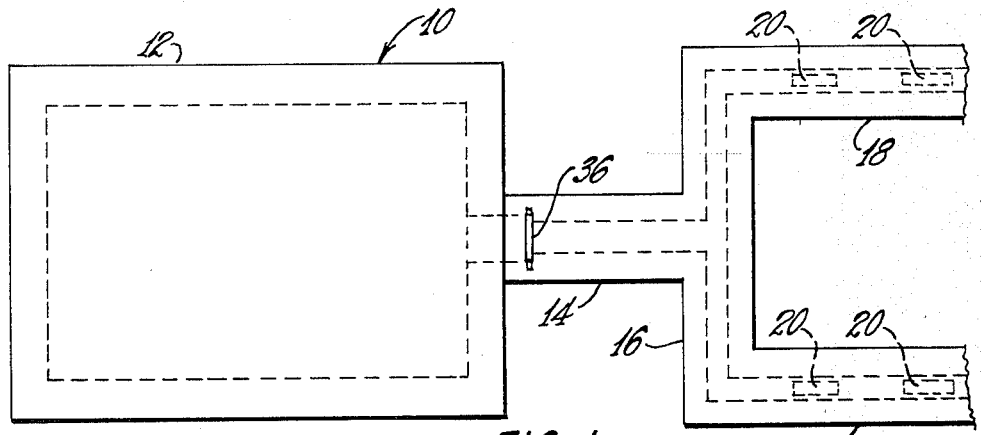
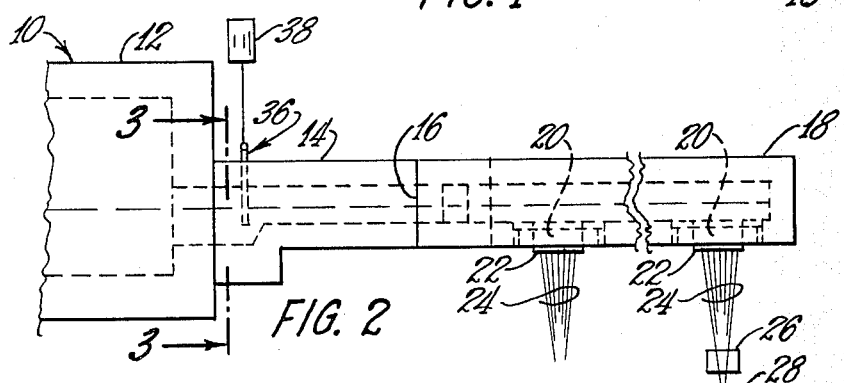
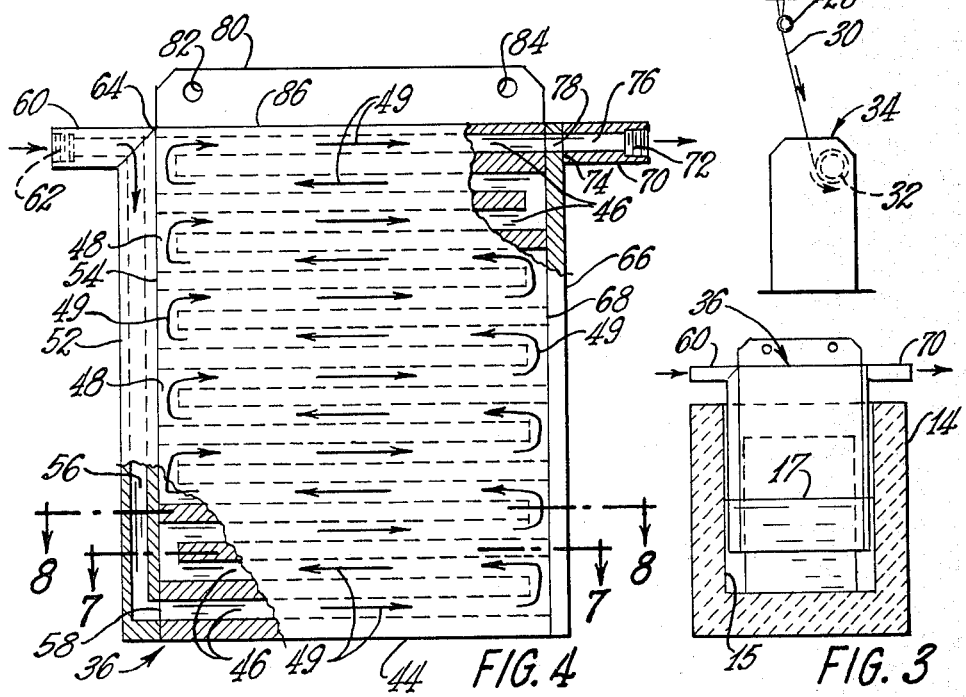
FIG. 1
FIG. 2
FIG. 4
FIG. 3

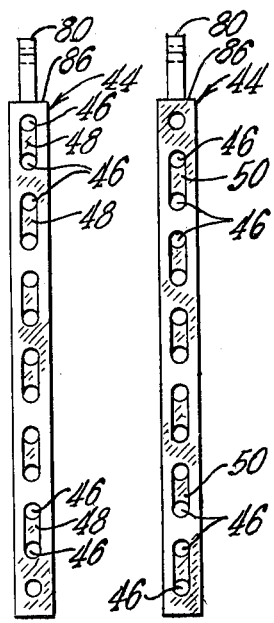
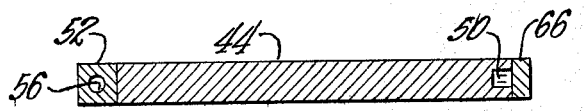
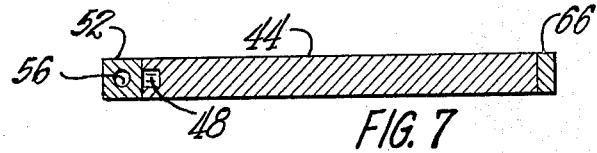
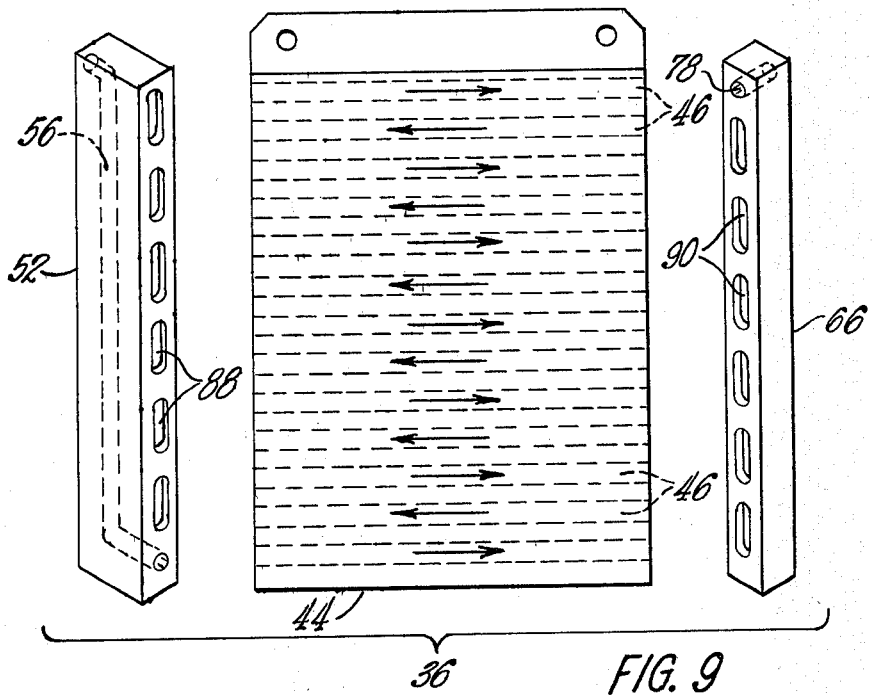

LIQUID COOLED SKIMMER

BACKGROUND OF THE INVENTION

This invention relates to a skimmer for use in a melting furnace and, more particularly, to a liquid cooled skimmer for use in the throat of a glass-melting furnace.

Skimmer blocks have been used in the outlets or throats of glass-melting furnaces, especially where the exiting molten glass must be of utmost purity, as when used to form fibers. In the manufacture of continuous textile filaments, a minute piece of batch material that has not become vitreous, commonly called a seed or stone, may cause a break in a filament being attenuated, thereby requiring the bushing operation to be stopped and restarted. A skimmer block positioned in the path of the exiting molten glass such that it extends above and below the surface thereof, acts as a dam to hold back seeds and bubbles formed from volatiles in the glass batch. In the prior art, liquid cooled skimmers have consisted of either circular or rectangular tubing that has been welded together to form a solid skimmer assembly. Such skimmers have been prone to leaks because the thin walls of the tubing do not provide a suitable surface for an adequate weld.

Therefore, it is an object of the present invention to provide a skimmer that eliminates the weldment problems and the inherent leakage problems in the skimmers of the prior art, thereby insuring a continuous and effective skimming operation.

SUMMARY OF THE INVENTION

In accordance with the present invention, there is provided a skimmer for use in a throat of a melting furnace. The skimmer comprises a plate having a plurality of passages therein with the passages being through the plate from a first side to a second side. Adjacent passages are in communication with each other to form a continuous passage through the plate. A first means for blocking the ends of the passages on the first side of the plate and a second means for blocking the ends of the passages on the second side of the plate are attached to the plate. A first port means is in communication with one end of the continuous passage for connecting with a cooling inlet located outside of the furnace, and a second port means is in communication with the other end of the continuous passage for connecting with a cooling outlet located outside of the furnace.

In addition, the present invention provides a skimmer comprising a plate having a plurality of passages therein with the passages being through the plate from a first side to a second side. A first means for providing communication between every other pair of adjacent passages and for blocking the ends of the other passages on the first side of the plate and a second means for providing communication between the adjacent passages not connected by the first communication and blocking means and for blocking the ends of the other passages on the second side of the plate, thereby forming a continuous passage through the plate, are attached to the plate. A first port means in communication with one end of the continuous passage is provided for connecting with a coolant inlet located outside of the furnace, and a second port means in communication with the other end of the continuous passage is provided for connecting with a coolant outlet located outside of the furnace.

Still further, the present invention provides a glass-melting furnace comprising a melting tank, a throat in communication with the melting tank for receiving molten glass therefrom, a channel means in communication with the throat for supplying molten glass therefrom toward a product-forming means, and a skimmer positioned in the throat. The throat has a top wall with an aperture through which the skimmer is lowered into position. The skimmer comprises a plate having a plurality of passages therein, the passages being through the plate from a first side to a second side with adjacent passages being in communication with each other, thereby forming a continuous passage through the plate; a first means attached to the plate for blocking the ends of the passages on the first side of the plate; a second means attached to the plate for blocking the ends of the passages on the second side of the plate; a first port means in communication with a first end of the continuous passage for connecting with a coolant inlet outside of the furnace; and a second port means in communication with a second end of the continuous passage for connecting with a coolant outlet outside of the furnace.

In the preferred embodiment, the plate or main portion of the skimmer consists of a solid block of nickel alloy through which a plurality of parallel passages have been drilled. The ends of the block are milled such that every other pair of adjacent passages are connected on alternate sides to form a continuous passage through the block. Additional rectangular pieces of nickel alloy, having an aperture therethrough and means necessary for coupling with either a coolant inlet or outlet located outside of the furnace, are attached by welding to opposite sides of the block to seal the ends of the passages. The apertures in the two end pieces are positioned such that they communicate with opposite ends of the continuous passage through the block.

Accordingly, the present invention provides a skimmer assembly that eliminates the weldment problems and potential leaks presented by the skimmers of the prior art. In particular, the only welding that is subjected to the furnace environment is that of the two end pieces to the solid block of nickel alloy which provide both a good weld foundation and also a long weld length, rather than the short weld length provided by the prior art.

Other objectives, advantages and applications of the present invention will be made apparent by the following detailed description of the preferred embodiments of the invention.

BRIEF DESCRIPTION OF THE DRAWINGS

FIG. 1 is a schematic, fragmentary plan view of a glass-melting furnace utilizing the present invention.

FIG. 2 is a schematic, fragmentary side view in elevation of the glass-melting furnace of FIG. 1.

FIG. 3 is an enlarged schematic view in cross section taken along the line 3—3 of FIG. 2.

FIG. 4 is a front view in elevation of the skimmer of the present invention.

FIG. 5 is a left side view in elevation of the main plate of the skimmer shown in FIG. 4.

FIG. 6 is a right side view in elevation of the main plate of the skimmer shown in FIG. 4.

FIG. 7 is a schematic view in cross section taken along the line 7—7 of FIG. 4.

FIG. 8 is a schematic view in cross section taken along the line 8—8 of FIG. 4.

FIG. 9 is an exploded perspective view of an alternative embodiment of the present invention.

DETAILED DESCRIPTION OF THE PREFERRED EMBODIMENTS

Referring to FIGS. 1 and 2, a conventional glass-melting furnace, which may be either fuel fired or electrically heated, is shown generally by numeral 10. Furnace 10 has a melting tank 12 to which glass batch materials are provided by a suitable feed means (not shown). The glass batch materials are converted to a vitreous state by the heat provided to melting tank 12 so that the glass batch materials are substantially fully molten by the time they reach outlet or throat 14. The molten glass flows from throat 14 through main channel 16 to forehearths 18. A plurality of outlets 20 are located in the bottom of each of forehearths 18, with the molten glass being supplied through outlets 20 to filament-forming bushings 22. The molten glass is attenuated through orifices in the bottom of each of bushings 22 into filaments 24.

Filaments 24 are coated with sizing material by applicator 26 and collected around gathering shoe 28 into strand 30 which is wound onto collet 32. Motor or winder 34 rotates collet 32 to provide the attenuating force which draws the molten glass through bushing 22 into filaments 24. Since filaments 24 are very small in diameter, the smallest impurity in the molten glass will bridge or substantially bridge the thickness of the filament and cause it to part. When a break occurs an operator must stop the operation of bushing 22, including all of the other unbroken filaments, collect the broken filament above the breakout and restart the filaments. Obviously, this process is time consuming and laborious and can seriously affect the production of bushing 22.

The glass flowing from melting tank 12 to throat 14 is substantially fully molten; however, it may contain minute particles of undissolved batch materials and foam which may be in the form of bubbles resulting from volatile materials in the glass batch. To prevent the passage of the seeds and bubbles to forehearth 18, skimmer 36 is positioned in throat 14 such that it is located both above and below the surface of the molten glass. The bubbles will either redissolve in the glass if held in throat 14 for a period of time or will redissolve in the glass as it passes under skimmer 36. Similarly, if the seeds or stones are held in the molten glass for a period of time, they will become fully molten by the time the glass with such particles passes under skimmer 36. The position of skimmer 36 is adjusted by lifting means 38 which may be, for example, a crane or hoist.

FIG. 3 shows a cross sectional view of throat 14 and the orientation therein of skimmer 36. Skimmer 36 is positioned proximate the entrance of throat 14 and perpendicular to the glass flow. The size of skimmer 36 is such that it substantially extends completely across passage 15 of throat 14 and extends from a point near the top of passage 15 to a point below the level of the glass in passage 15, the glass level being indicated by line 17. The cooling of skimmer 36 will freeze the glass between the side edges of skimmer 36 and the sidewalls of passage 15, thereby preventing molten glass from flowing between skimmer 36 and the sidewalls of passage 15.

Referring to FIGS. 4 through 8, skimmer 36 has a rectangular main plate 44, that preferably consists of a solid block of nickel alloy, through which parallel passages 46 have been drilled. One end of main plate 44, for example, the left side as shown in FIGS. 5 and 7, is milled such that every other pair of adjacent passages 46 are connected by an aperture 48. Similarly, the other side of main plate 44, i.e., the right side as shown in FIGS. 6 and 8, is milled such that the pairs of adjacent passages 46 not connected by apertures 48 are connected by apertures 50. Therefore, a continuous passage is formed through main plate 44 as shown by arrows 49 in FIG. 4.

A rectangular end plate 52 is connected to main plate 44, for example, by means of a weld along the surface of contact 54. End plate 52 has a passage 56 which is in communication at point 58 with one end of the continuous passage formed in main plate 44. An inlet adapter 60 having threads 62 for mating with a coolant inlet line (not shown) is connected to end plate 52, for example, by means of a weld along the surface of contact 64.

A rectangular end plate 66 is attached to the other side of main plate 44 to enclose or cover the ends of passages 46. End plate 66 may be attached to main plate 44 by a weld located along the surface of contact 68. An outlet adapter 70 having threads 72 for mating with a coolant outlet line (not shown) is attached to end plate 66 by, for example, welding along surface of contact 74. Outlet adapter 70 has an aperture 76 which is in communication with passage 78 of end plate 66 which, in turn, is in communication with the other end of the continuous passage in main plate 44. In addition, a lifting plate 80 having apertures 82 and 84, which are adapted for mating with a crane or hoist for raising and lowering skimmer 36, is connected to main plate 44 by a weld along surface of contact 86.

Inlet adapter 60 and outlet adapter 70 enable skimmer 36 to be connected to a coolant system located outside of the furnace. The coolant enters skimmer 36 through inlet adapter 60 and moves through passage 56 of end plate 52. From passage 56 the coolant moves through the continuous passage in main plate 44 formed by passages 46 and apertures 48 and 50 to passage 78 in end plate 66. From passage 78 the coolant moves into outlet adapter 70 from which it is returned to the coolant system.

Referring to FIG. 9, an alternative embodiment of the present invention is shown in an exploded perspective view. As discussed above, skimmer 36 has a rectangular main plate 44, that preferably consists of a solid block of nickel alloy, through which parallel passages 46 have been drilled. However, in this embodiment the sides of main plate 44 are not milled to connect alternate pairs of adjacent passages. Rather, end plates 52 and 66 are milled to provide apertures 88 and 90, respectively, to connect alternate pairs of adjacent passages 46, thereby forming a continuous passage through main plate 44. As in the previously discussed embodiment, end plates 52 and 66 have passages 56 and 78 which allow communication with a coolant system located outside of the furnace.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

We claim:

1. A skimmer for use in a throat of a melting furnace, said skimmer comprising: a plate having a plurality of passages therein, said passages being through said plate from a first side to a second side with adjacent passages being in communication with each other, thereby forming a continuous passage through said plate; a first means attached to said plate for blocking the ends of said passages on said first side of said plate; a second means attached to said plate for blocking the ends of said passages on said second side of said plate; a first port means in communication with a first end of said continuous passage for connecting with a coolant inlet outside of said furnace; and a second port means in communication with a second end of said continuous passage for connecting with a coolant outlet outside of said furnace.

2. A skimmer as recited in claim 1, wherein said plate is rectangular.

3. A skimmer as recited in claim 2, wherein said first port means is connected to said first blocking means and said second port means is connected to said second blocking means.

4. A skimmer as recited in claim 3, wherein said skimmer further comprises cooperating means attached to said plate for connecting said skimmer to means for raising and lowering said skimmer.

5. A skimmer for use in a throat of a melting furnace, said skimmer comprising: a plate having a plurality of passages therein, said passages being through said plate from a first side to a second side; a first means attached to said plate for providing communication between every other pair of adjacent passages and for blocking the ends of the other passages on said first side of said plate; a second means attached to said plate for providing communication between the adjacent passages not connected by said first communication and blocking means and for blocking the ends of the other passages on said second side of said plate, thereby forming a continuous passage through said plate; a first port means in communication with a first end of said continuous passage for connecting with a coolant inlet outside of said furnace; and a second port means in communication with a second end of said continuous passage for connecting with a coolant outlet outside of said furnace.

6. A skimmer as recited in claim 5, wherein said plate is rectangular.

7. A skimmer as recited in claim 6, wherein said first port means is connected to said first communication and blocking means and said second port means is connected to said second communication and blocking means.

8. A skimmer as recited in claim 7, wherein said skimmer further comprises cooperating means attached to said plate for connecting said skimmer to means for raising and lowering said skimmer.

9. A skimmer for use in a throat of a melting furnace, said skimmer comprising: a rectangular main plate having a plurality of parallel passages disposed horizontally through said plate from a first side to a second side, with every other pair of adjacent passages being connected by vertical passages located between said adjacent passages on said first side and the remaining pairs of adjacent passages being connected to each other by vertical passages located therebetween on said second side, thereby forming a continuous passage through said plate; a first rectangular end plate attached to said main plate and adapted for blocking the ends of said plurality of parallel passages on said first side of said main plate, said first end plate having a first means for connecting with a coolant inlet outside of said furnace and a passage that allows communication between said first connecting means and a first end of said continuous passage; and a second rectangular end plate attached to said main plate and adapted for blocking the ends of said plurality of parallel passages on said second side of said rectangular plate, said second end plate having second means for connecting with a coolant outlet outside of said furnace and a passage that allows communication between said second connecting means and a second end of said continuous passage.

10. A glass-melting furnace comprising: a melting tank; a throat in communication with said melting tank for receiving molten glass therefrom, said throat having a top wall with an aperture therein; channel means in communication with said throat for supplying molten glass therefrom toward a product-forming means; a skimmer positioned proximate said throat through said aperture, said skimmer comprising: a plate having a plurality of passages therein, said passages being through said plate from a first side to a second side with adjacent passages being in communication with each other, thereby forming a continuous passage through said plate; a first means attached to said plate for blocking the ends of said passages on said first side of said plate; a second means attached to said plate for blocking the ends of said passages on said second side of said plate; a first port means in communication with a first end of said continuous passage for connecting with a coolant inlet outside of said furnace; and a second port means in communication with a second end of said continuous passage for connecting with a coolant outlet outside of said furnace.

* * * * *